UNITED STATES PATENT OFFICE.

ALFONS LANGER, OF FRIEDRICHSBERG, NEAR BERLIN, GERMANY.

BLOOD COMPOUND OF GLYCEROPHOSPHATE OF LIME AND CALCIUM.

No. 884,026.　　　　　Specification of Letters Patent.　　　Patented April 7, 1908.

Application filed December 24, 1906. Serial No. 349,335.

*To all whom it may concern:*

Be it known that I, ALFONS LANGER, a subject of the German Emperor, residing at Friedrichsberg, near Berlin, Germany, have invented a Blood Compound of Glycerophosphate of Lime and Calcium, of which the following is a description.

The object of the present invention is to attain a product inclosing the natural iron of the blood of cattle such as ox-blood, the said product being used either as a blood forming preparation or as an article of food or luxury. It is advantageously produced by mixing defibrinized animal blood with glycerophosphoric acid.

The process is carried out in the following manner:—3 kilos of glycerophosphoric acid are dissolved in 300 kilos of defibrinized ox-blood. This has the effect of splitting the blood albumin and the product of the separation reacts with the glycerophosphoric acid to form a basic salt, viz. glycerophosphate of albumin. To the mixture thus obtained and while the same is in a cold state, are added 12 kilos of a lime paste containing about 50% of calcium hydroxid. The result will be an albumin double salt of glycerophosphate of albumin and albuminate of calcium, which will of course contain all other constituent parts of the blood and particularly the hematin-globin or hæmo-globin,—a compound proteid containing iron.

A second example may be carried out in the following manner:—4 to 5 kilos of glycerophosphate of lime, which does not easily dissolve in water are mixed with 300 kilos of defibrinized ox-blood, in which the gylcerophosphate of lime easily dissolves, owing to its reaction with the blood albumin. The products obtained are allowed to dry by vaporization of the moisture in them.

I make no claim in this application to the process for producing the product, which process forms the subject matter of my application Serial No. 256161.

I claim as my invention:—

A product, 30% of which is soluble and 70% insoluble in cold water, containing the constituent parts of ox-blood, with the exception of the fibrinogen, the said constituent parts being chemically bound up in part with glycerophosphate of lime and partly with calcium.

In testimony whereof I affix my signature in the presence of two witnesses.

ALFONS LANGER.

Witnesses:
　WOLDEMAR HAUPT,
　HENRY HASPER.